United States Patent [19]
Yamano

[11] Patent Number: 5,132,801
[45] Date of Patent: Jul. 21, 1992

[54] SIGNAL CORRECTION DEVICE OF PHOTOELECTRIC CONVERSION EQUIPMENT

[75] Inventor: Shozo Yamano, Tokyo, Japan

[73] Assignee: Nikon Corporation, Tokyo, Japan

[21] Appl. No.: 533,393

[22] Filed: Jun. 5, 1990

[30] Foreign Application Priority Data

Jun. 7, 1989 [JP] Japan .................. 1-144730

[51] Int. Cl.⁵ .......... H04N 3/14; H04N 5/335
[52] U.S. Cl. .......................... 358/213.16
[58] Field of Search ......... 358/213.16, 213.15, 358/213.11, 213.13, 213.18, 213.19, 213.24, 167, 171, 213.17; 377/57, 58

[56] References Cited

U.S. PATENT DOCUMENTS

| | | | |
|---|---|---|---|
| 4,216,503 | 8/1980 | Wiggins | 358/280 |
| 4,293,877 | 10/1981 | Tsunekawa et al. | 358/213.16 |
| 4,484,223 | 11/1989 | Tsunekawa | 358/213.16 |
| 4,602,291 | 7/1986 | Temes | 358/221 |
| 4,630,121 | 12/1986 | Suzuki et al. | 358/227 |
| 4,739,495 | 4/1988 | Levine | 364/571 |
| 4,839,729 | 6/1989 | Ando et al. | 358/213.16 |

FOREIGN PATENT DOCUMENTS

| | | | |
|---|---|---|---|
| 0104174 | 8/1980 | Japan | 358/213.16 |
| 0260070 | 10/1988 | Japan | 358/213.16 |
| 63-263881 | 10/1988 | Japan . | |
| 0028770 | 2/1989 | Japan | 358/213.16 |

Primary Examiner—James J. Groody
Assistant Examiner—Safet Metjahic
Attorney, Agent, or Firm—Shapiro and Shapiro

[57] ABSTRACT

A signal correcting device of photoelectric conversion equipment having a series of photoelectric conversion devices, including a shaded pixel section and an unshaded pixel section, employs a memory which stores data obtained when the series of photoelectric conversion devices is in a dark state beforehand, as at the time of manufacture and assembly. The stored data is retrieved during actual use of the photoelectric conversion equipment and is utilized in the correction of output signals from the unshaded photoelectric conversion devices.

7 Claims, 6 Drawing Sheets

SIGNAL CORRECTION DEVICE OF PHOTOELECTRIC CONVERSION EQUIPMENT

BACKGROUND OF THE INVENTION

1. Field of the Invention

The present invention relates to a signal correction device of photoelectric conversion equipment.

2. Related Background Art

Photoelectric conversion devices such as a CCD image sensor have been used for detection of camera focus, but with this type of charge storage sensor a dark current component generated irrespective of the injected light constitutes a factor which restricts the focus detecting performance of the sensor, particularly when brightness is low.

When brightness is low, storage time of the sensor is made longer to obtain some signal component, but the dark current component is generated in proportion to the storage time, and as a result the signal-to-noise ratio (S/N) becomes lower. In view of this problem, proposals have been made regarding compensation of the dark current component.

For example, it has been proposed to shade a section of the photoelectric conversion devices and to utilize the difference between the output of an open section and the output of the shaded section. However, this is not sufficiently effective, because it does not compensate the actual dark current component in each light receiving bit.

Japanese Patent Appln. Laid-Open No. 63-263881 discloses a compensation device wherein each light receiving bit is compensated by means of temperature detecting means and storage time counting means. The value for correction is obtained from the output of the temperature detecting means and the output of the storage time counting means in reference to the output at dark time registered in an EEPROM beforehand (dark time output being influenced by environmental temperature and storage time). Although this device has the advantage of enabling correction of each bit, it requires a separate temperature detecting means and storage time counting means, so the device is more complicated.

SUMMARY OF THE INVENTION

According to the present invention, even when variation exists in the dark data of each pixel of a series of photoelectric conversion devices (due to the fluctuation of dark data caused by environmental temperature, storage time and pixel performance), proper photoelectric output data are obtained by correction of dark data of each pixel.

In a 1st embodiment of the invention, the ratio of the pixel signal of a shaded pixel at the time of actual optical detection and the pixel signal of the shaded pixel stored beforehand at an earlier dark time is obtained, and a correction value for each unshaded pixel is obtained utilizing the ratio and stored dark data of the unshaded pixel at the earlier dark time. In a 2nd embodiment, the deflection of dark current of each unshaded pixel as against the dark current of a standard pixel is stored beforehand and is used in a correction process at the time of actual optical detection. As the result, in actual use, where environmental temperature and storage time differ from those during the manufacture and assembly, the dark data component which is influenced by the environmental temperature and storage time is eliminated, and proper photoelectric output data are obtained.

BRIEF DESCRIPTION OF THE DRAWINGS

FIGS. 1-5 show a 1st embodiment of the present invention.

DESCRIPTION OF THE PREFERRED EMBODIMENTS

The 1st embodiment of the present invention will be explained in reference to FIGS. 1-5.

Figure 1:
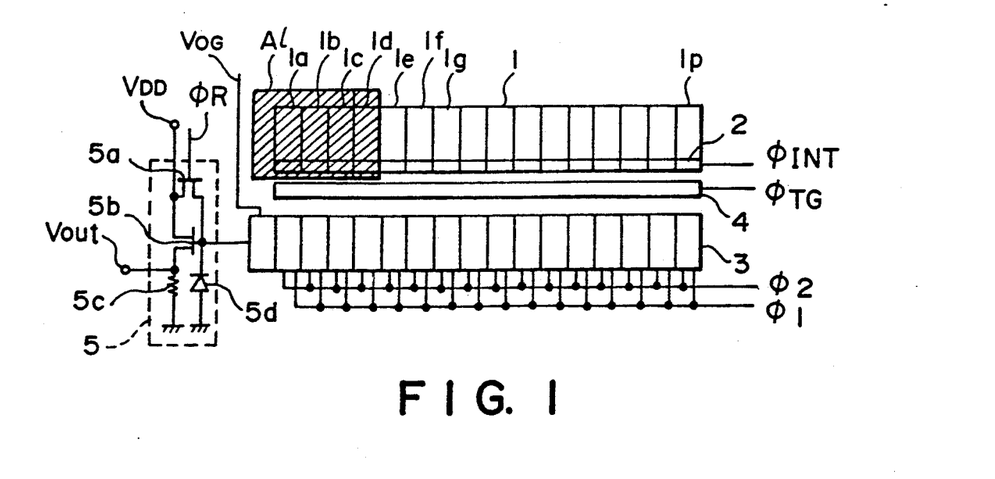
FIG. 1 is a diagrammatic view of the sensor section of the photoelectric conversion equipment.

FIG. 1 shows the charge storage time image sensor of the 1st embodiment of the present invention.

Photoelectric conversion pixel series 1 is composed of a plurality of photoelectric conversion devices which comprise light shaded pixel section $1a$–$1d$, whose upper surface is covered by aluminum Al and is thus shaded from light, and open pixel section $1e$–$1p$, which is not shaded from light.

Charge storage section 2 is provided for each of the pixels $1a$–$1p$ wherein storage of photoelectric charges is controlled by storage signal $\phi$INT coming from a pulse generator to be described later. Shift gate 4 is provided in between a CCD shift register 3 and storage section 2, and upon receipt of shift signal $\phi$TG coming from the pulse generator, it shifts the charges stored in storage section 2 to CCD shift register 3 all at once.

Thus shifted pixel signal charges are transmitted one after another by the transmission clock $\phi 1$ and the reversed phase clock $\phi 2$ to the output amplifier section 5. Output amplifier section 5, composed of charge resetting transistor $5a$, output transistor $5b$, resistor $5c$, and diode $5d$ acting as an equivalent capacitor, converts the received signal charges into voltages one after another and outputs them to V out. The output amplifier 5 is a publicly known output circuit having the function of resetting an output signal charge before the next stage signal charge is transmitted.

Figure 2:
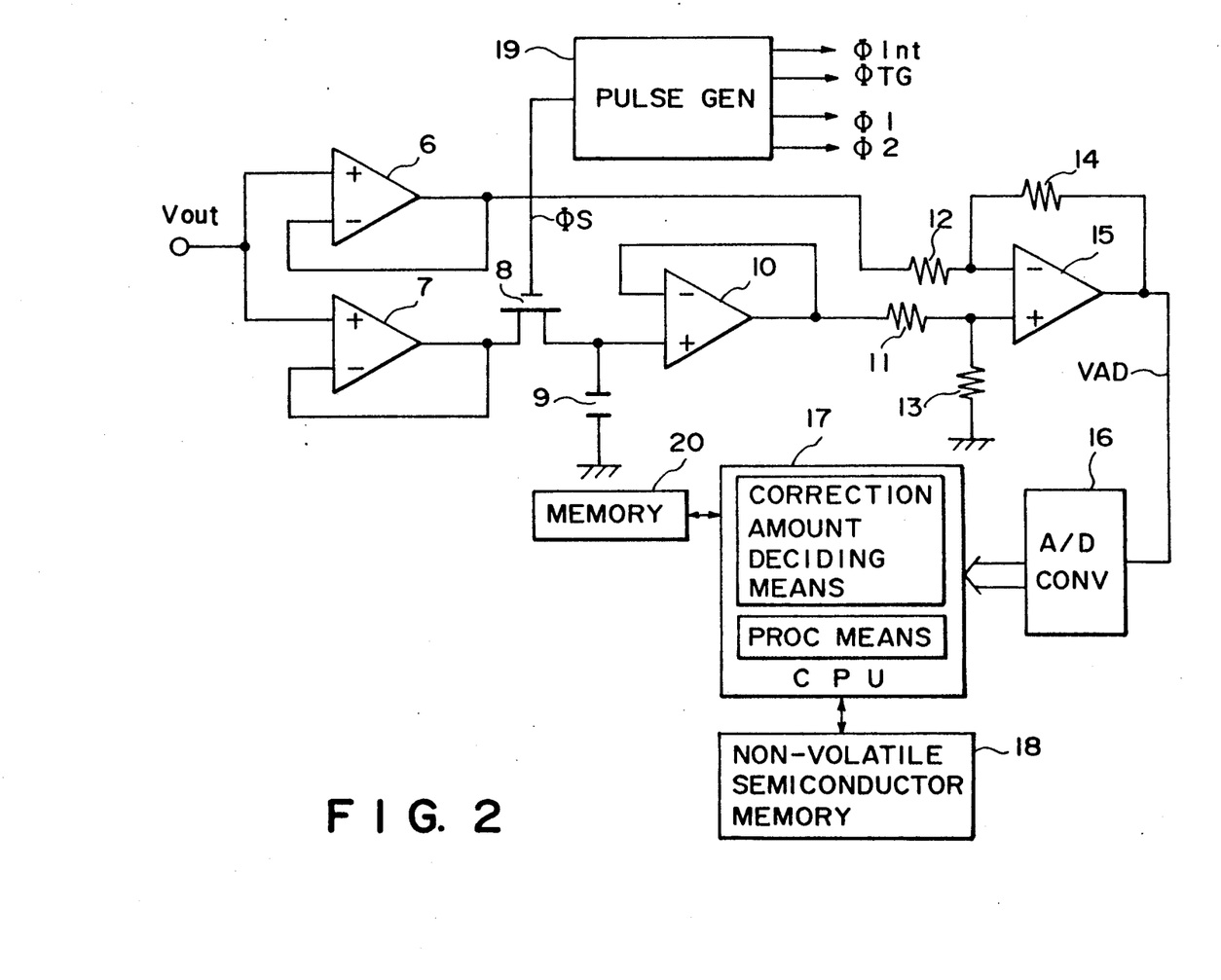
FIG. 2 is a block diagram of a signal correcting device of the photoelectric conversion equipment.

FIG. 2 shows the signal processing circuit connected to the output terminal V out of output amplifier 5 of the charge storage type image sensor.

The terminal V out of the output amplifier 5 is connected to a buffer 6 and a buffer 7. The output of buffer 7 is connected to an input terminal of holding condenser 9 and follower 10 via sampling FET8, the other terminal of condenser 9 being grounded.

A differential amplification circuit is composed of resistor 11, resistor 12, resistor 13, resistor 14 and operational amplifier 15. The non-inverting terminal of operational amplifier 15 is connected to the output of follower 10 via resistor 11, and the inverting terminal is connected to the output of buffer 6 via resistor 12.

The output of operational amplifier 15 is input to the A/D converter 16, and the output of the A/D converter is connected to CPU17. Non-volatile semi-conductor memory 18 is connected to CPU17 to enable the input and output of desired data to and from CPU17. Data memory 20 is also connected to CPU17.

Pulse generator 19 delivers signals $\phi$INT, $\phi$TG, $\phi$1 and $\phi$2 to the image sensor and delivers signal $\phi$S to the FET8. ON/OFF switching of FET8 is controlled by the signal $\phi$S from pulse generator 19.

Figure 3:
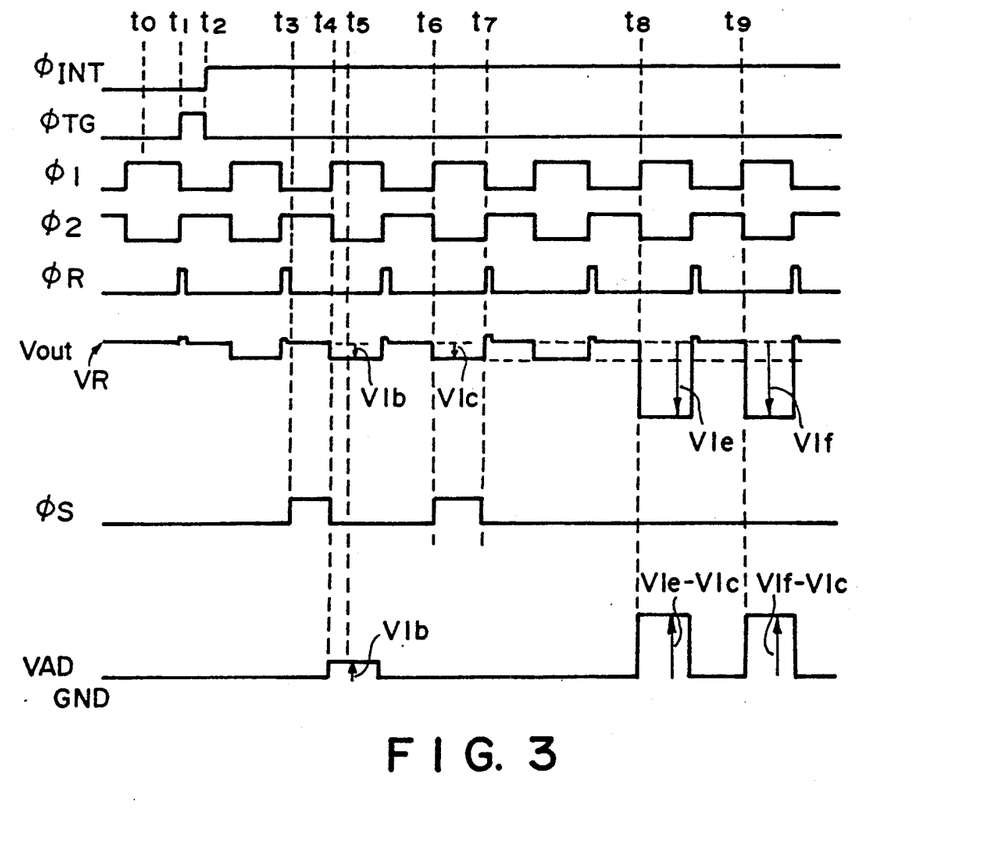
FIGS. 3 and 4 are timing charts of the signal correction circuit of the photoelectric conversion equipment.

The operation of the embodiment constructed as above will now be explained in reference to the timing chart of FIG. 3. First, an explanation will be given as to the process to memorize dark data of shaded pixels 1a–1d (more particularly, the dark data of pixel 1b) in the data memory 20 at the time of actual use, and the process to memorize the net photoelectric output data obtained by subtracting the memorized dark data (more particularly, the dark data of pixel 1c) from outputs of the open pixel section 1e–1p and storing the difference in the data memory 20. The reason why the pixels 1b and 1c are selected for the dark data is that their reliability is higher than that of pixels 1a and 1d. The pixel 1a is positioned at the end of the series 1, so its performance is inferior, and the pixel 1d is influenced by adjacent pixel 1e which is not shaded from light.

When the transmission clock $\phi$1 impressed on the CCD shift register 3 becomes "H" (high), signal charge for one pixel is transmitted to output amplifier 5. Pixel signals are output from output amplifier 5 one after another chronologically. When the transmission clock $\phi$1 changes from "H" to "L" (low), a reset pulse $\phi$R is applied to the charge resetting transistor 5a, and the output of the output amplifier 5 is reset.

Time t0; during storage operation

Timing t0 is the time when the charge storage section 2 is in storage operation.

Time t1; during the shift from storage section 2 to CCD shift register 3

At the completion of storage, after elapse of present storage time, pulse $\phi$TG ("H") is applied to shift gate 4 at timing t1. Then the signal charges stored at storage section 2 of photoelectric pixel series 1 are shifted to CCD shift register 3 all at once.

Time t2; end of shift

When shift pulse $\phi$TG becomes "L", storage control signal $\phi$INT is reset (from "L" to "H") and storage section 2 becomes ready for accepting the succeeding charge storage.

Time t3; completion of reset of output amplifier 5

At timing t3 when transmission clock $\phi$1 is "L" and reset pulse $\phi$R becomes "L", gate signal $\phi$S ("H") is applied to sampling FET8 and FET8 is switched ON. Consequently, the holding condenser 9 at the input of follower 10 is reset to the potential (VR of V out) prior to the introduction of a pixel signal of CCD shift register 3.

Time t4; start of transmission of pixel signal of pixel 1b

At timing t4 when transmission clock $\phi$1 changes from "L" to "H", $\phi$S changes from "H" to "L", FET8 is turned OFF, and the VR potential is held at the output of follower 10.

Time t5; memorizing pixel signal 1b

While transmission clock $\phi$1 is "H", the charge corresponding to shaded pixel 1b is introduced to output amplifier 5 and its output is input to buffer 6 and operational amplifier 15 of the differential amplification circuit. The output V AD of amplifier 15 becomes V 1b, which is the net output of shaded pixel 1b corresponding to the actual storage performance. A/D converter 16 executes A/D conversion of the dark data, and CPU17 registers the converted data at the present address of data memory 20 as the 1st A/D conversion value.

Time t6; start of transmission of pixel signal of pixel 1c

At output timing t6 of pixel 1c of the shaded section, gate signal $\phi$S ("H") is again provided to the sampling FET8 and FET8 turns ON. Output V 1c of pixel 1c of the shaded section is applied to the condenser 9 for holding the input of follower 10.

Time t7

At timing t7 immediately before the change of transmission clock $\phi$1 from "H" to "L", gate signal $\phi$S becomes "L", and potential V 1c is held at the output of follower 10.

Time t8; memorizing the pixel output of open pixel section dark data

When transmission clock $\phi$1 becomes "H", electric charge corresponding to open section pixel 1e is introduced to output amplifier 5, and output V 1e of output amplifier 5 is input to buffer 6 from output terminal V out. Output V AD of the differential amplifier circuit becomes the data V 1e–V 1c (by subtraction of the aforesaid dark data V 1c from the open section pixel output V 1e), A/D conversion of such data is executed by A/D converter 16, and CPU17 memorizes the converted data at a specified address in the data memory 20 as the pixel signal of open section pixel 1e.

Time t9

In the same manner, the output V 1f–V 1c which corresponds to open section pixel 1f is memorized at a specified address in the data memory 20.

Through the same process, when transmission clock $\phi$1 becomes "H", the output corresponding to open pixels 1g–1p is memorized at specified addresses in the data memory 20 as the data obtained by subtraction of dark data V 1c. Thus, photoelectric output data V 1e–V 1c, V 1f–V 1c . . . are memorized one after another at the specified addresses in the data memory 20.

A/D conversion of the difference is effective in securing a wider dynamic range of the signal which is restricted by the A/D conversion input range.

Figure 4:
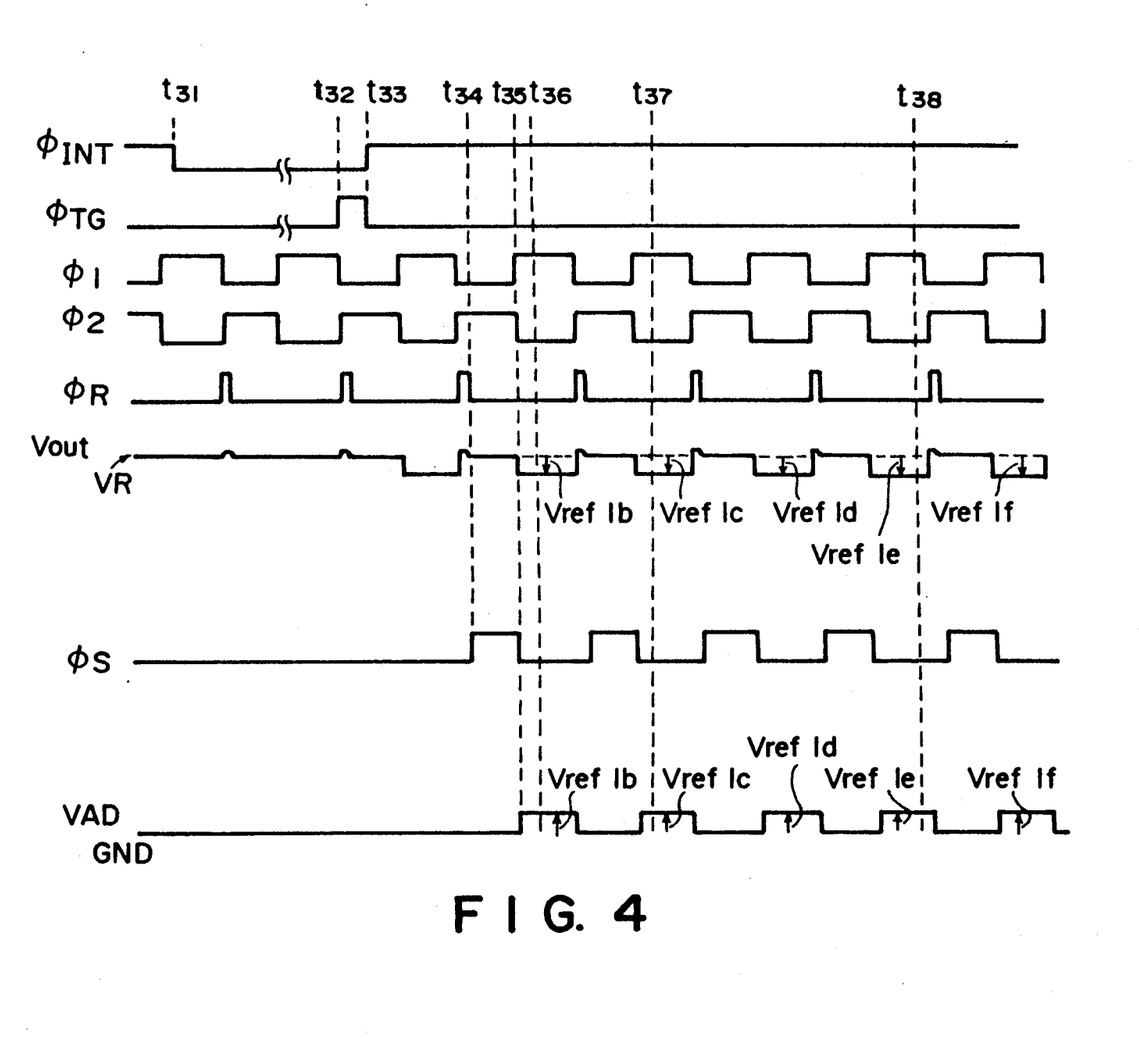

Next the memorizing process of dark time output data by non-volatile memory 18 will be explained. First the photoelectric conversion pixel series 1 is brought into a dark state by shading equipment. When the device is used for detection of camera focus, such preparation occurs at the time of assembly and adjustment. FIG. 4 is a timing diagram to explain the operation of this process.

Time t31; start of storage

Storage at storage section 2 starts.

Time t32; transfer from storage section 2 to CCD shift register 3

When storage is completed, after elapse of present storage time, for example a storage time of 200 mS, pulse φTG ("H") is applied to shift gate 4 at timing t32, and the stored signal charge of the photoelectric pixel series 1 (dark time output of each pixel) is transmitted to CCD shift register 3.

Time t33; end of shift

When shift pulse φTG becomes "L", the storage control pulse φINT is reset and storage section 2 becomes ready for accepting the succeeding charge storage.

Time t34; end of reset of output amplifier 5

At timing t34, which is prior to the output of shaded pixel 1b, gate signal φS ("H") is applied to sampling FET8, FET8 turns ON, and the reset potential VR (the potential before the input of pixel signal into the output amplifier) from output terminal V out is applied to the condenser 9 for holding.

Time t35; pixel signal output of pixel 1b

The phase of transmission clock φ1 reverses, and the signal V reflb of shaded section pixel 1b is output at the output terminal V out of output amplifier 5 and is input to the buffer 6.

Time t36; memorizing pixel signal of pixel 1b

V reflb, which is the net output of pixel 1b of the shaded section, becomes the output of the operational amplifier 15 of the differential amplifying circuit and is A/D converted, and the result is entered at a specified address of non-volatile memory 18 via CPU 17.

Time t37; memorizing pixel signal of pixel 1c

In the same manner, V reflc, which is the net output of pixel 1c of the shaded section, becomes the output of the differential amplifying circuit and is A/D converted, and the result is entered at a specified address of non-volatile memory 18 via CPU17.

Time t38; memorizing pixel signal of pixel 1e

Likewise, for open pixel 1e, reset potential VR of the terminal V out of output amplifier 5 prior to the output is sampled, and V refle, which is the net output of open section pixel 1e, becomes the output of the differential amplifier circuit and is A/D converted, and the result is entered into a specified address of non-volatile memory 18 via CPU17.

In the same manner, A/D conversion of the output of each open section pixel is executed, and the result is entered at a specified address of non-volatile memory 18.

Thus, dark data of photoelectric conversion device series 1 is memorized in the non-volatile memory 18 beforehand at the time of manufacture and assembly.

The memorized dark data of the shaded pixel section and the open pixel section of photoelectric conversion device series 1 are used to provide dark current correction data for each open pixel by the following procedure at the time of storage for detection of a photographed image.

Figure 5:
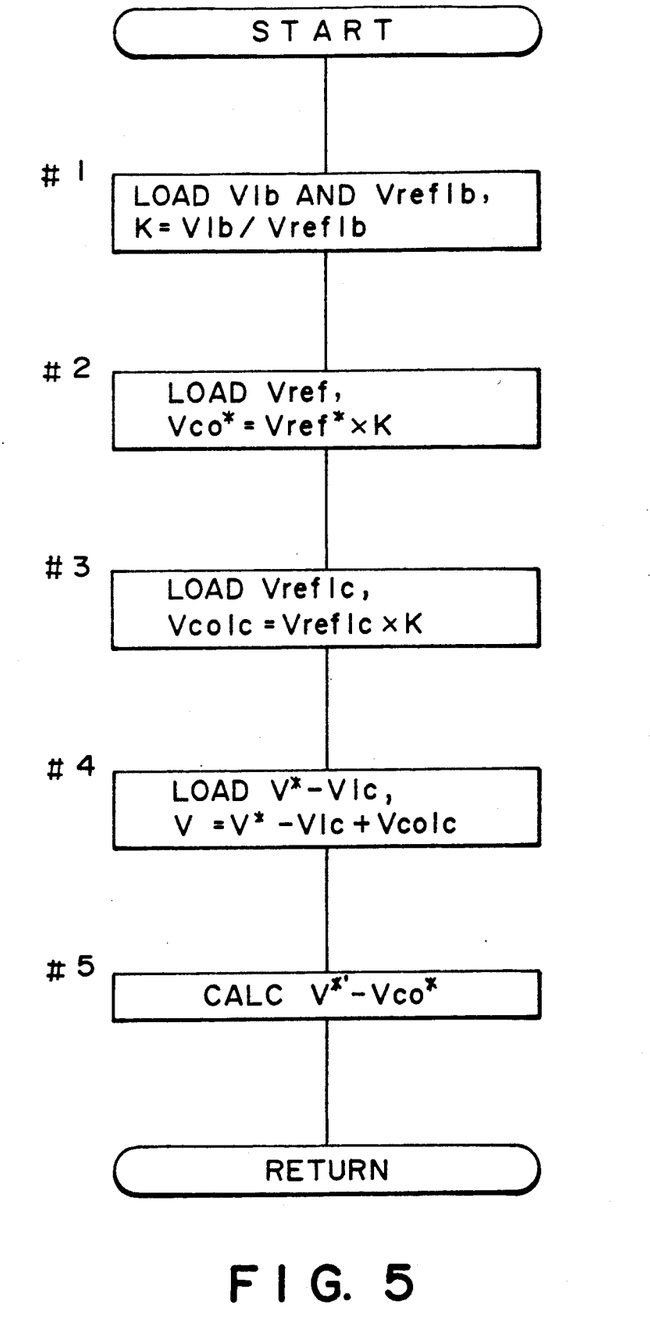
FIG. 5 is a flow chart of a CPU of the signal correction circuit.

FIG. 5 is a flow chart of operation of CPU17 for dark current correction at the time of actual image detection of photoelectric conversion device series 1.

(No. 1) First, CPU17 reads from memory 18 the dark data V reflb at the end of charge storage of photoelectric conversion device series 1, and in the same manner it reads from memory 20 the dark data V 1b. Then the ratio (V 1b/V reflb) is obtained, referred to hereinafter as "K".

(No. 2) Then CPU17 reads from memory 18 the dark data V ref* = V refle, which corresponds to open section pixel 1e, and this is multiplied by K. Thus a calculation is performed according to V co* = V ref* × K (here * refers to conversion devices 1e-1p), i.e., V co* = V cole = V refle × K, to obtain a correction value.

(No. 3) Then CPU17 reads from memory 18 the dark data V reflc, corresponding to shaded section pixel 1c, and this is multiplied by K to obtain V colc = V reflc × K.

In order to effectively use the dynamic range of A/D converter 16, data are rearranged in the form (V 1e − V 1c) which is the result of subtraction of dark data from an open pixel signal, and after A/D conversion, converted data are registered in the data memory 20. Therefore it is necessary to return the signal of an open pixel to the original output signal before executing a correction operation to be indicated hereinafter. For such processing, V colc is obtained.

(No. 4) CPU17 reads from memory 20 the output of open section pixel 1e, namely, $$(V^* - V\,1c) = (V\,1e - V\,1c)$$

and adds V colc = (V reflc × K) obtained in the step No. 3, thus obtaining $$\begin{aligned} V^{*\prime} &= V^* - V\,1c + V\,colc \\ &= V\,1e - V\,1c + V\,colc = V\,1e'. \end{aligned}$$

(No. 5) CPU17 executes a correction calculation with the above data as follows:

When correction value V cole obtained in No. 2 is subtracted from photoelectric output data V 1e′ corresponding to open pixel 1e, proper photoelectric output data can be obtained. In other words, correction calculation $V^{*\prime} - V\,co^* = V\,1e' - V\,cole$ is executed to obtain the proper photoelectric output data given by correction of dark data.

Such proper photoelectric output data are memorized in data memory 20.

(No. 6) Thereafter the steps No. 2–No. 5 are executed in the same way for each open pixel to correct the output of each open pixel.

Thus, for all the open pixels of photoelectric conversion device series 1, proper photoelectric output data are stored in data memory 20. With a publicly known camera focus detecting device, a focus detecting operation can be conducted based on such photoelectric output data.

At steps No. 3 and No. 4, to obtain V 1e′, each open pixel output is A/D converted after subtracting V 1c. Therefore it is necessary to return to the pixel signal containing dark output by adding V colc to the converted value, but this is simply an operation for signal processing having no direct relation with the present invention. When a pixel signal containing dark output is A/D converted, it is sufficient to simply subtract the correction value (for example V cole) from the respective pixel signal (for example photoelectric output V 1e).

Figure 6:
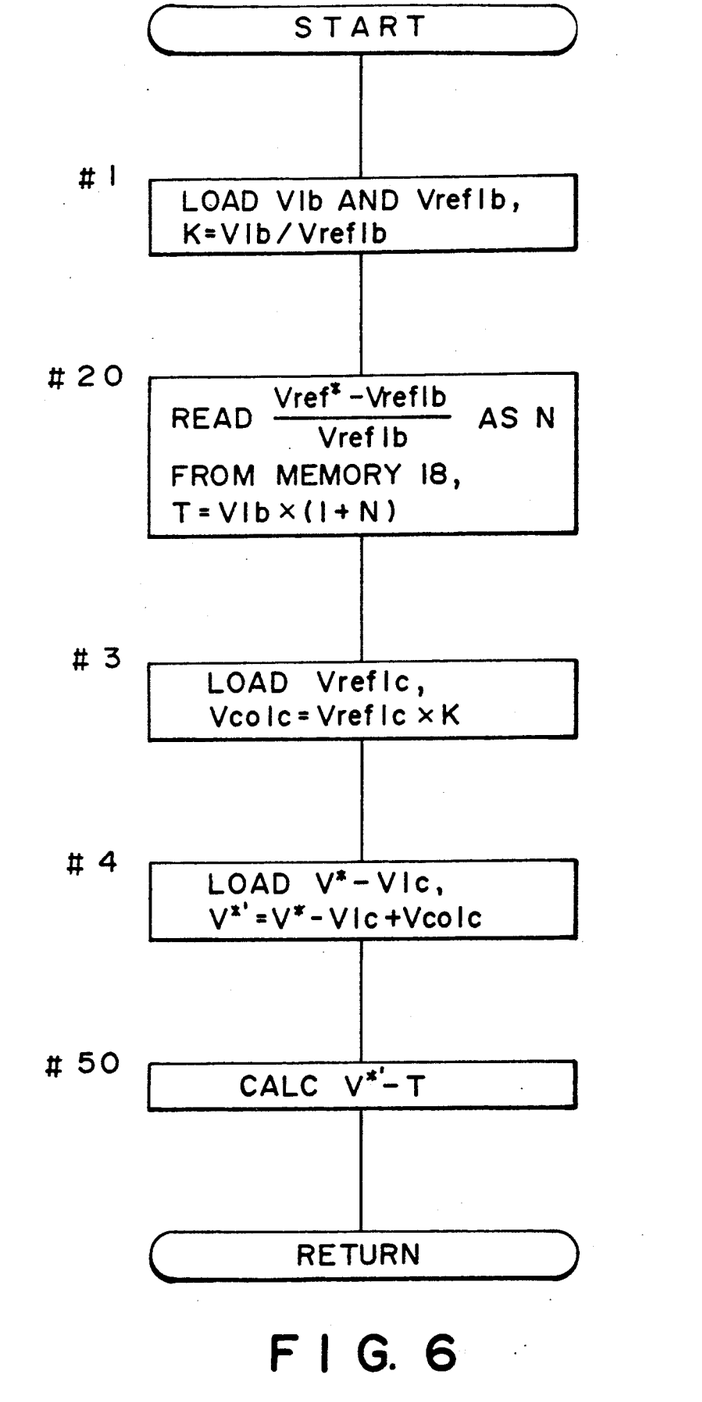
FIG. 6 is a flow chart of a CPU of the signal correction circuit of a 2nd embodiment of the present invention.

Next a 2nd embodiment of the present invention is explained in reference to FIG. 6. This 2nd embodiment differs from the aforesaid 1st embodiment only as to (No. 2) and (No. 5); all the rest of the steps are identical with the 1st embodiment. Therefore, an explanation will be given only as to the steps which are different from the 1st embodiment.

In step No. 20, CPU17 reads the deflection data N stored in the form of (V ref* − V reflb)/V reflb from non-volatile memory 18 and executes the following calculation:

$$= V\ 1b\ [1+N].$$

N indicates the degree of variation (deflection) of dark current of photoelectric output V ref* of each pixel of the open pixel section, as against the standard pixel $1b$ in the shaded state. When such deflection N of dark current is obtained for each open pixel, the deflection at the actual time of image detection will be obtained by executing the calculation $T = V\ 1b\ [1+N]$ of dark current which is inherent to each pixel $1e-1p$ of photoelectric conversion device series 1.

Then at step No. 50, a correction operation $(V^{*'} - T)$ is conducted to obtain appropriate photoelectric output data.

In order to store the data in the non-volatile memory 18 in the form of $N = (V\ ref^* - V\ reflb)/V\ reflb$, it is sufficient to store it after CPU17 executes the operation of the above equation at t38 given in the explanation of FIG. 4. With this arrangement, it is possible to effectively utilize the memory capacity.

As stated earlier, the present invention has an advantage in that the amount of correction for each pixel already includes the factors of temperature and storage time, and therefore it is not necessary to pay special attention to temperature and storage time.

In the 1st embodiment, the ratio of the pixel signal of a shaded pixel of the photoelectric conversion device at actual injection of light and the pixel signal of the shaded pixel at an earlier dark time is obtained, and the correction value of each open pixel to be corrected is obtained from this ratio and the dark data of open pixels at dark time memorized in 1st memory means beforehand. With such correction value, correction of the dark current component is conducted for each open pixel, and therefore the dark data corresponding to the performance of each photoelectric conversion device are precisely corrected and a remarkable improvement of performance is realized when brightness is low.

In the case of the 2nd embodiment, by memorizing the deflection of dark current of the open pixels as against the dark current of a standard pixel beforehand at the time of manufacture and assembly, it is possible to correct the dark current of open pixels at the time of actual optical detection, and consequently dark data corresponding to the performance of each photoelectric conversion device is precisely corrected and a remarkable improvement of performance is realized at the time of low brightness.

Figure 7:
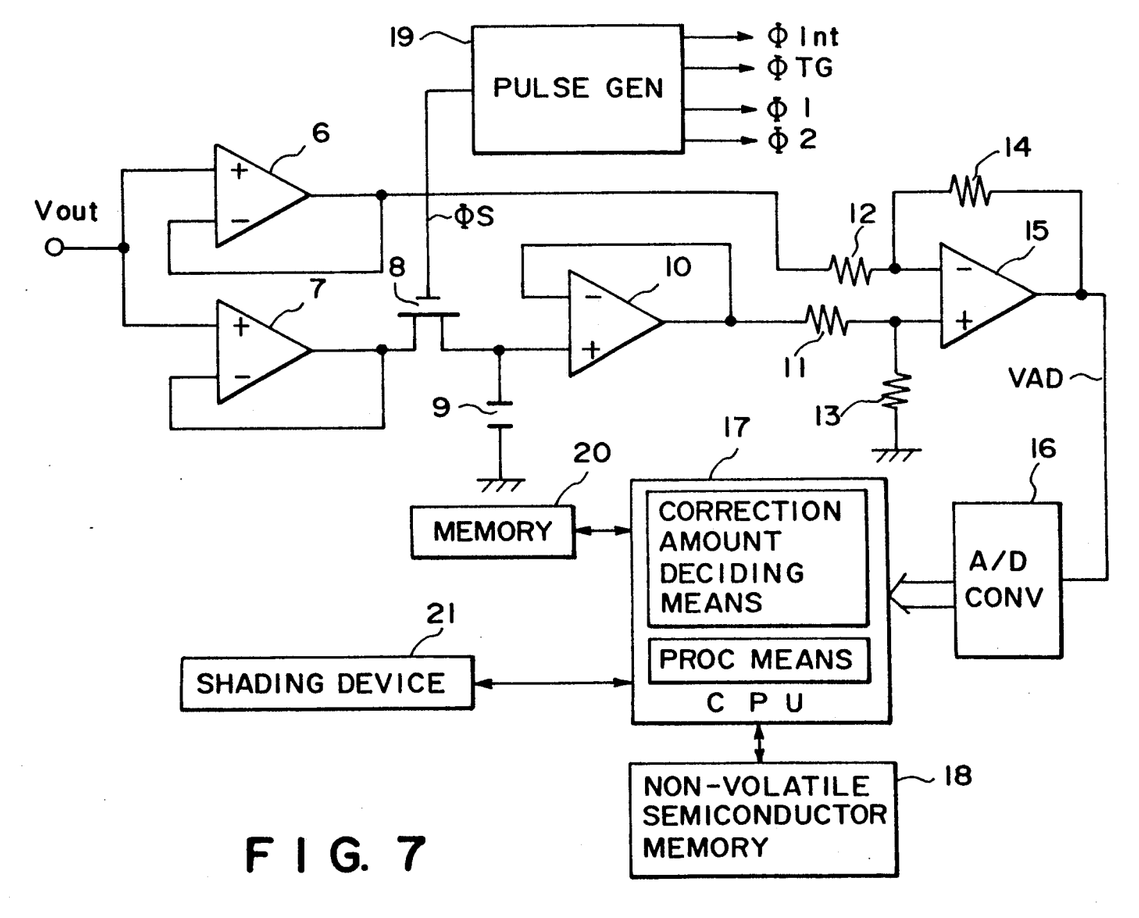
FIG. 7 is a block diagram of a signal correction device of the photoelectric conversion equipment of a modification of the present invention.

FIG. 7 is a block diagram of a signal correction device of photoelectric conversion equipment of a modification of the present invention. An explanation will be given mainly as to parts different from those of the 1st embodiment.

In FIG. 7, a shading device 21 which can freely shade the light irradiating the image sensor, is connected to CPU17. The shading device shades the image sensor in response to an output signal of CPU17, and due to such shading by the shading device, dark data are output. The dark data thus output are entered into specified addresses of non-volatile memory 18 via CPU17. Then, in response to an output signal of CPU17, the shading device ends its shading of the image sensor, and the open pixel section $1e-1p$ outputs a signal corresponding to the received light.

I claim:

1. A signal correction device of photoelectric conversion equipment having a series of photoelectric conversion devices which produce outputs, the series of photoelectric conversion devices including a shaded section and an unshaded section, comprising:
   memory means for storing 1st data obtained from the outputs of photoelectric conversion devices while the unshaded section is in a dark state;
   means for obtaining 2nd data from the outputs of photoelectric conversion devices while in use;
   means for determining a correction amount for correcting the output of each device of the unshaded section based on a ratio of 2nd data to 1st data, said ratio being the ratio of an output of a device of the shaded section while in use and the output of that device in said dark state; and
   processing means for correcting the output of each device of the unshaded section in accordance with a correction amount determined therfor.

2. A signal correction device according to claim 1, wherein said correction amount comprises the product of said ratio and the output of a device of the unshaded section while in said dark state.

3. A signal correction device according to claim 2, wherein said processing means subtracts said correction amount from a quantity based on the output of a device of the unshaded section while in use.

4. A signal correction device according to claim 3, wherein the last-mentioned quantity is determined by subtracting from the output of a device of the unshaded section while in use the output of another device of the shaded section while in use and adding thereto a further quantity.

5. A signal correction device according to claim 4, wherein the further quantity is equal to the product of said ratio and the output of the last-mentioned device in said dark state.

6. A signal correction device of photoelectric conversion equipment having a series of photoelectric conversion devices which product outputs, the series of photoelectric conversion devices including a shaded section and an unshaded section, comprising:
   memory means for storing deflection data for each device of the unshaded section as against the output of a standard device, said deflection data comprising a ratio of two quantities, one of which is the difference between the output of a device of the unshaded section and the output of a standard device of the shaded section in a dark state, and the other of which is the last-mentioned output;
   means for determining a correction amount for correcting the output of each device of the unshaded section based on said deflection data, said correction amount being equal to the output of said standard device while in use multiplied by a quantity equal to 1 plus said ratio; and
   processing means for correcting the output of each device of the unshaded section in accordance with the correction amount determined therefor.

7. A signal correction device according to claim 6, wherein said processing means subtracts said correction amount from the output of each device of the unshaded section while in use.

* * * * *